United States Patent [19]

Saito et al.

[11] Patent Number: 5,233,589
[45] Date of Patent: Aug. 3, 1993

[54] METHOD FOR RECORDING/REPRODUCING INFORMATION HAVING A FUNCTION OF CORRECTING VARIATIONS IN THE INTERVAL IN REPRODUCED DATA AND APPARATUS FOR REALIZING SAME

[75] Inventors: Atsushi Saito, Ichikawa; Takeshi Maeda, Kokubunji; Shinichi Arai, Odawara; Satoshi Kawamura, Yokohama; Takuya Mizokami, Odawara, all of Japan

[73] Assignee: Hitachi, Ltd., Tokyo, Japan

[21] Appl. No.: 460,370

[22] Filed: Jan. 3, 1990

[30] Foreign Application Priority Data

Jan. 6, 1989 [JP] Japan ................ 64-000298

[51] Int. Cl.$^5$ ............................ G11B 20/00
[52] U.S. Cl. ...................... 369/48; 369/59; 369/124
[58] Field of Search ........... 369/13, 47, 48, 59, 369/109, 110, 111, 116, 124

[56] References Cited

U.S. PATENT DOCUMENTS

| | | | |
|---|---|---|---|
| 4,057,833 | 11/1977 | Braat | 369/109 X |
| 4,160,269 | 7/1979 | Kramer et al. | 369/109 |
| 4,646,103 | 2/1987 | Sugiyama et al. | 369/109 X |
| 4,835,759 | 5/1989 | Saito et al. | 369/59 |
| 4,866,692 | 9/1989 | Saito et al. | 369/59 |

Primary Examiner—W. R. Young
Attorney, Agent, or Firm—Antonelli, Terry, Stout & Kraus

[57] ABSTRACT

In a method for recording/reproducing information, a reference pattern is recorded in a certain predetermined domain so that the leading-edge and the tailing-edge of a certain recorded portion are positioned in a predetermined relationship, when coded bits of data are recorded on a recording medium by forming recorded portions physically different from not recorded portions, while making them correspond to leading-edges and tailing-edges of the recorded portions. A first and a second reproduced signal indicating the leading-edge and the tailing-edge of the recorded portion, respectively, are detected independently from each other from a reproduced waveform corresponding to the recorded portion, which has been thus recorded; and the first and the second reproduced signal are reconstructed while correcting edge shifts produced at recording data by storing the first and second reproduced signal in a memory, so that the first and the second reproduced signal indicate the leading-edge and the tailing-edge of the recorded portion corresponding to the reference pattern, respectively, in the predetermined relationship.

33 Claims, 8 Drawing Sheets

METHOD FOR RECORDING/REPRODUCING INFORMATION HAVING A FUNCTION OF CORRECTING VARIATIONS IN THE INTERVAL IN REPRODUCED DATA AND APPARATUS FOR REALIZING SAME

BACKGROUND OF THE INVENTION

The present invention relates to a signal recording-/reproducing method for correcting the interval in a series of reproduced data obtained from read-out signals of record data recorded in a recording medium to obtain a normal, interval and an apparatus for realizing same. The invention relates in particular to a signal recording/reproducing method capable of reproducing data stably also against variations in the length of data (pit length) taking place at the time of recording data on an optical recording medium by utilizing heat of a light beam and an apparatus for realizing same, which are suitable for use in an optical disc storage apparatus.

In a prior art optical disc storage apparatus, as disclosed e.g. in U.S. Pat. No. 4,835,759 (JP-A-Sho 62-8370), a method is used, by which, in order to absorb or correct variations in the length of recording pits produced by variations in the characteristics of the recording medium and recording conditions, a predetermined demodulation start-pattern, i.e. SYNC pattern, is made to correspond to leading-edges and tailing-edges of the recording pits, as means for detecting the amount of variations from the normal length of the pit, and a time difference between the 2 SYNC pattern detection signals obtained from the leading-edges and the tailing-edges at the time of reproduction is detected by a time-difference detecting circuit consisting of a delaying element having a plurality of taps with a constant delay time interval and flipflops. By this method, since the time-difference the detection amount was determined by the time between two adjacent taps of the delaying element, results were dispersive and there were problems in the detecting resolution and the detecting accuracy. Further, apart from the fact that it is difficult to suppress fluctuations among different apparatuses to small values, even for a certain optical disc storage apparatus, since the detection and the correction of the variations in the pit length are effected by using only the heading of each sector, it is thought that, in the case where media-characteristics and recording conditions are different for the first half and the second half of the sector, there are problems that errors are great and that the overhead becomes somewhat greater, because a duplex SYNC pattern is used.

On the other hand, as a method for correcting variation in the pit length at the reproduction, a method proposed in JP-A-Sho 62-254514 is known. This is a method, by which an edge detecting circuit, a synchronizing clock generating circuit, etc. are added to a threshold setting circuit, and a reproduction clock signal syhchronized with the leading-edges of reproduced pulses made binary at a certain threshold value is generated by the clock generating circuit, the reproduced pulses being synchronized again by using this reproduced clock. Here a difference signal between the original reproduced pulse and the resynchronized reproduced pulse is formed and deviations of the tailing-edges of the reproduced pulse with respect to the reproduced clock are detected. This difference signal is given to the threshold setting circuit through a low pass filter. In this way it is possible to obtain the optimum threshold value by increasing or decreasing the threshold value so that the difference signal is zero.

By this method, the least condition for demodulating data precisely is that variations in the position of the tailing-edges with respect to the leading-edges of the reproduced signal are comprised within a distance corresponding to the time width of one period of the reproduced clock. Since one period of the reproduced clock corresponds in general to the data detection-window width, with other words variations in the position of the pit edges allowed at data recording should be necessarily comprised within the detection-window width. However, in the practical recording state, it is conceivable that variations exceeding the detection-window width are produced by various conditions, such as variations in the recording power and the recording pulse width, sensitivity fluctuations of the recording medium, variations in the intensity distribution of the recording-/reproducing light spot, etc. There is a possibility that these variations take place not only in ablative recording media, but also in phase-change media, magneto-optical media, etc. In any case, in the case where recording portions (recording pits or recording domains) exceeding the detection-window width are formed, unless some correction is executed, erroneous data is recognized. A method may be conceivable by which the threshold value is increased or decreased, relying upon the duty ratio of the data pattern so as to obtain the normal data pulse width. However, unless the gradient of the leading-edges and the tailing-edges of the reproduced signal is sufficiently small, it is not possible to correct completely the errors only by the increase or decrease of the threshold value. On the contrary, if the gradient is too small, it is feared that variations in the position of the edges of the reproduced pulse after having been made binary are great due to noises contained in the reproduced signal. In a prior art circuit for producing binary data, for the reason described above, the correction is not possible for variations at the recording exceeding the detection-window width.

As described above, according to the prior art technique, in the case where variations in the recorded pit length produced by variations in the recording condition at the recording exceeded the detection-window width, there was a problem that the correction could not be executed only by increasing or decreasing the threshold value at the time of producing binary data.

Further, an information recording/reproducing method capable of recording/reproducing information in a stable manner by using edge record recording coded bits of the data, making them correspond to the leading-edges and the trailing-edges of the recording pits, and correcting the recording pulse width and the recording power at the time of recording so as to correct the variations in the edge position at the reproduction, has been proposed in U.S. Pat. No. 4,866,692.

SUMMARY OF THE INVENTION

The object of the present invention is to provide a method and apparatus for recording/reproducing information which enable the correcting of edge shifts to make it possible to demodulate data regardless of variations in the pit length produced at the time of recording.

A method for recording/reproducing information according to the present invention is characterized in that, when coded bits of data are recorded on a recording medium by forming recorded portions physically different from not recorded portions, while making them correspond to leading-edges and tailing-edges of the recorded portions, a reference pattern is recorded in a certain predetermined domain so that the leading-edge and the tailing-edge of a certain recorded portion are positioned in a predetermined relationship; a first and a second reproduced signal indicating the leading-edge and the tailing-edge of the recorded portion, respectively, are detected independently from each other from a reproduced waveform corresponding to the recorded portion, which has been thus recorded; and the first and the second reproduced signal are reconstructed, while correcting edge shifts produced at the time of recording data by storing the first and the second reproduced signal in a memory, so that the first, and the second reproduced signal indicate the leading-edge and the tailing-edge of the recorded portion corresponding to the reference pattern, respectively, in the predetermined relationship described above.

An apparatus for recording/reproducing information according to the present invention is characterized in that, it comprises recording/reproducing means, which records a reference pattern in a certain predetermined domain so that the leading-edge and the tailing-edge of a certain recorded portion are positioned in a predetermined relationship, when coded bits of data are recorded on a recording medium, by forming recorded portions physically different from not recorded portions, while making them correspond, to leading-edge and tailing-edges of the recorded portions to obtain a reproduced waveform corresponding to the recorded portion, which has been thus recorded; edge detecting means, which detects a first and a second reproduced signal indicating the leading-edge and the tailing-edge of the recorded portion, respectively, independently from each other, from the reproduced waveform described above; and reproduced data synthesizing means, which reconstructs the first and the second reproduced signal, while correcting edge shifts produced at recording data by storing the first and the second signal thus detected independently in a memory, so that a first and a second signal thus detected indicate the leading-edge and the tailing-edge of the recorded portion corresponding to the reference pattern recorded in the predetermined domain, respectively, in the predetermined relationship described above.

A feature of the present invention consists particularly in the construction of the reproduced data synthesizing means, and according to an aspect of the present invention, the reproduced data synthesizing means comprises first and second memory means for storing the first and the second reproduced signal, respectively, and first and second writing address control means, which are started by the first and the second detected signal indicating the leading-edge and the tailing-edge of the recorded portion corresponding to the reference pattern and control a writing address for the first memory means and a writing address for the second memory means, so that they are in the predetermined relationship described above, the reproduced data, for which the edge shifts produced at recording data, being outputted by synthesizing the outputs of the first and second memory means.

More concretely speaking, the reproduced data synthesizing means comprises:

first pattern detecting means, which detects that the first reproduced signal is in correspondence with the pattern of the leading-edge of the recorded portion corresponding to the standard pattern, and outputs the first detected signal;

second pattern detecting means, which detects that the second reproduced signal is in correspondence with the pattern of the tailing-edge of the recorded portion corresponding to the reference pattern, and outputs the second detected signal;

first writing address control means, which, started by the first detected signal, starts the count from the first address;

second writing address control means, which, started by the second detected signal, starts the count from the second address, which is in the predetermined relationship to the first address;

first register means, which writes data corresponding to the first reproduced signal in the address assigned by the output of the first writing address control means in synchronism with a first clock synchronized with the first reproduced signal;

second register means, which writes data corresponding to the second reproduced signal in the address assigned by the output of the second writing address control means in synchronism with a second clock synchronized with the second reproduced signal; and means for obtaining data synchronized with a third clock by synthesizing the outputs of the first and the second register means.

Further, the present invention is characterized in that a recorded synchronizing pattern is used together with the data as the reference pattern. The synchronizing pattern includes a VFO synchronizing pattern recorded at the heading of the data and a resynchronizing pattern recorded between the VFO synchronizing pattern and the data.

Still further, according to another aspect of the present invention, the length of the recorded portion corresponding to the reference pattern is detected by using the first and the second detected signal. It is thus characterized in that the recording power for forming the recorded portion corresponding to the data is controlled, corresponding to the length of the recorded portion thus detected.

DESCRIPTION OF THE PREFERRED EMBODIMENTS

Figure 1:
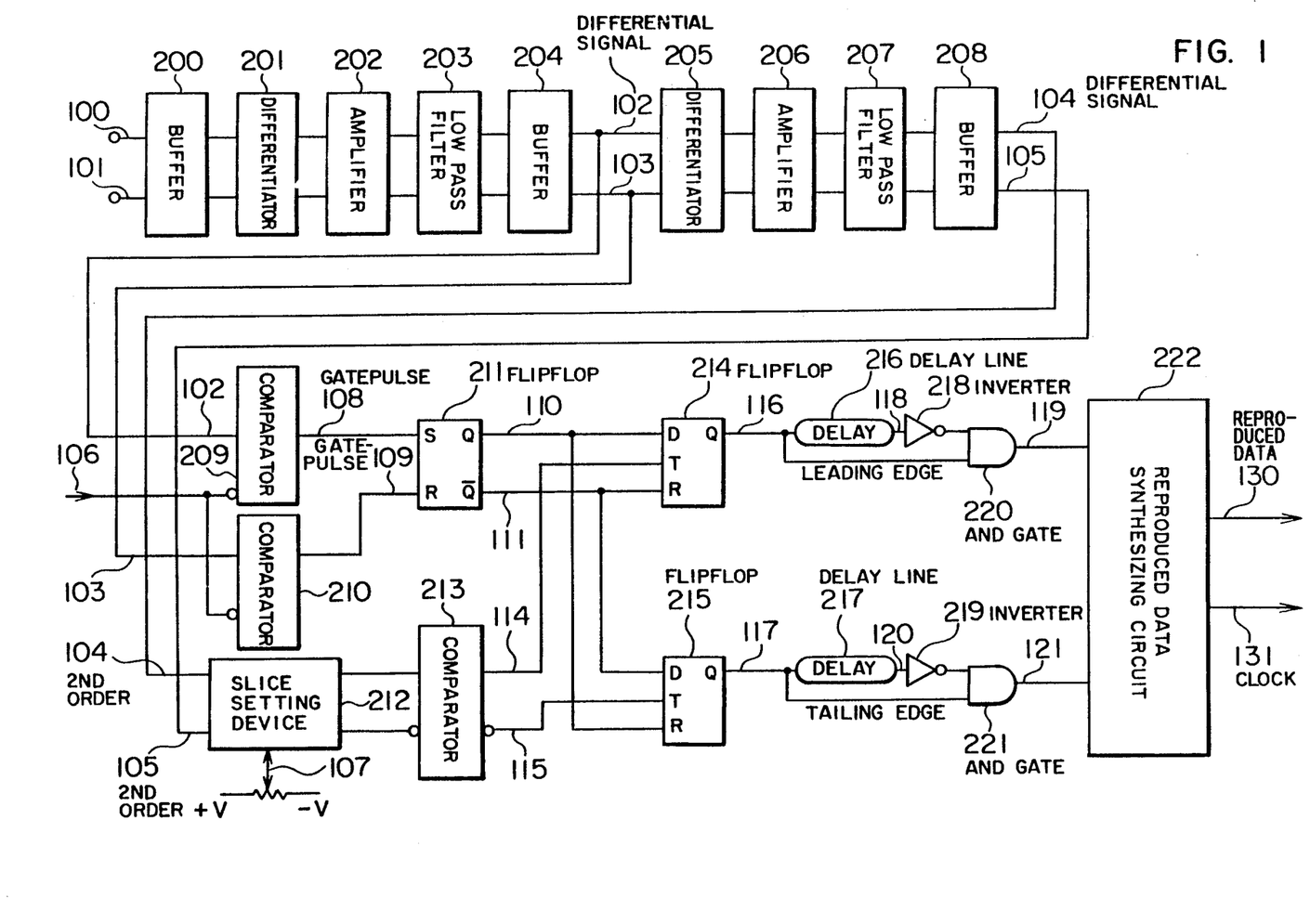
FIG. 1 is a block diagram showing a first embodiment of the present invention.
Figure 2:
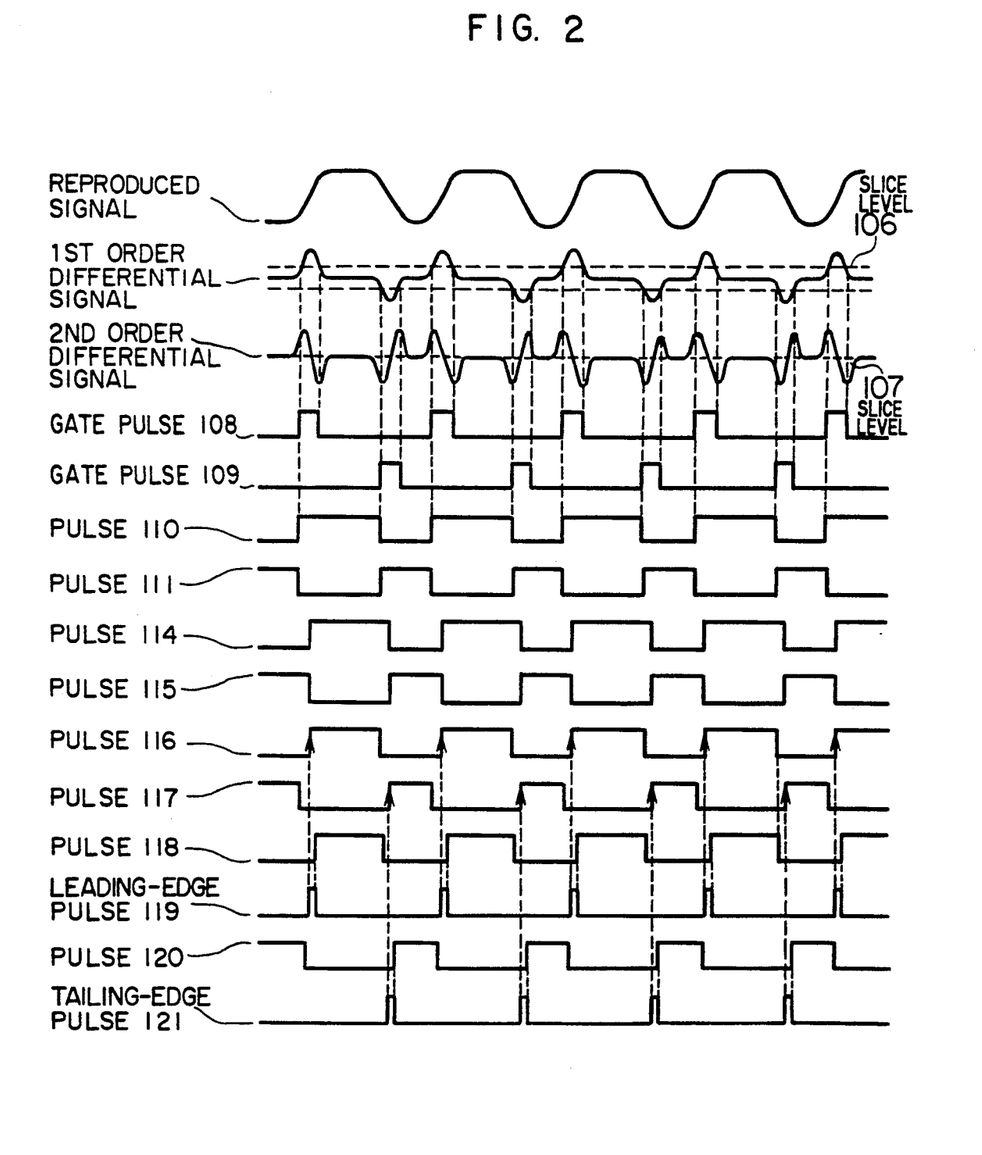
FIG. 2 is a time chart for explaining the operation of a second order differential detection method.

FIG. 1 is a block diagram of a circuit for explaining an embodiment of the present invention, which circuit operates to reproduce data recorded by a recording method, by which coded bits are made to correspond to the position of the edges of the recording pit and includes a reproduced data synthesizing circuit. FIG. 2 is a time chart showing the operation of the part of the circuit for generating an edge position detection pulse. In FIG. 1, the part corresponding to the optical pick-up serving as the recording/reproducing means in an optical disc storage apparatus has been explained in detail in U.S. Pat. No. 4,835,759 and in U.S. Pat. No. 4,866,692, and so and it is omitted here. A feature of the present invention consists in the reproduced data synthesizing circuit. However, the present invention can be applied to either the ablative type, the phase-change type or the magneto-optical type. It can be applied further to those, even if they are signals obtained by memory means other than optical discs or transmission means, as long as they can be objects of the reproduced data synthesis, as an object of the present invention.

An embodiment of the data storage system according to the present invention will be explained, referring to FIGS. 1 and 2. Although explanation is made by taking an optical disc storage system as an example, the recording medium and the optical pickup, which is recording-/reproducing means, are omitted. The optical pickup includes an optical head consisting of a laser driven and controlled by a driving circuit; an optical system for focusing laser light emitted by the laser on the recording medium; and opto-electric converter which receives light reflected by the recording medium and converts it into electric signals. For example, in an ablative optical disk, a recording film is locally melted and removed to form recorded pits by modulating the light beam in the intensity by means of recording pulse having a pulse width with a rise edge and a fall edge corresponding to 1 or 0 of the coded data signal, which is to be recorded. In an opto-magnetic disc, magnetic domains having a magnetization direction different from that in the not recorded portions are formed in the recording medium by using a light beam as heating means and applying a magnetic field having a direction corresponding to the recording pulses thereto, while irradiating it with the light beam. The reflected light modulated by the recorded portions, such as the recorded pits, the recorded domains, etc. is converted into electric signals and the electric signals give rise to reproduced waveforms corresponding to the recorded portions. Reproduced signals 100, 101 obtained by the opto-electric converting means are inputted in a buffer 200 as differential signals. The reproduced signal 100 corresponds to presence or absence of the recorded portions (pits or domains), which are recorded e.g. on the optical disc. For example, since the reflection coefficient is lowered in the pit portions, the level of the reproduced signal is lower than that for the not recorded portions. In the case of the opto-magnetic recording, the level of the reproduced signal is determined, corresponding to the orientation of the vertical magnetization on the disc. The output of the buffer 200 is applied to a differentiator 201 to obtain a first order differential signal. Thereafter, it is amplified to a suitable level by means of an amplifier 202 and applied to a buffer 204 after having passed through a low pass filter 203 so that first order differential signals 102, 103 are obtained as the outputs. In the edge recording, the positive and the negative peak positions of the first order differential signal correspond to the leading-edge the tailing-edge position of the reproduced signal, respectively. In order to obtain the peak position therefrom, the first order differential signals 102 and 103 are again differentiated. After having been differentiated by means of a differentiator, the signals pass through an amplifier 206, a low pass filter 207 and a buffer 208 just as described above to obtain second order differential signals 104 and 105. The zero cross points of the second order differential signals 104 and 105 correspond exactly to the peak position of the first order differential signals 102 and 103. The first order differential signals 102 and 103 are applied to 102 and 103, respectively, to obtain gate pulses 108 and 109. Here the slice level 106 is the threshold value for generated gate pulses. The purpose for the use of gate pulses 108 and 109 is that erroneous pulses generated at points other than the zero cross points of the second order differential signals 104 and 105 are not recognized as data. The gate pulses 108 and 109 are applied to the set (S) and the reset (R) terminals of a flipflop 211, respectively, and thus pulses 110 and 111 are obtained as outputs (Q, $\overline{Q}$). On the other hand, the second order differential signals 104 and 105 are applied to a slice setting device. A comparator 213 is a differential comparator, which outputs pulses 114 and 115. Further, the pulses 114 and 115 are applied to the trigger, input (T) of flipflops 214 and 215, respectively, and at the same time the pulses 110 and 111 are applied to the flipflops 214 and 215, respectively. In this way a pulse 116 is obtained by taking-in the pulse 110, using the rise of the pulse 114 as a trigger, and resetting it by the "H" level state of the pulse 111. This is the same for a pulse 117. In the present embodiment, the rise of the reproduced pulse 116 corresponds to the position of the leading-edge of the reproduced signal 100 and the rise of the reproduced pulse 117 corresponds to the position of the tailing-edge of the reproduced signal 100. A pulse 119 is obtained by forming a logical product (AND) of the inverted pulse of a signal 118 obtained by delaying the pulse 116 by means of a delay line 216 and the original pulse 116. In the same way, a pulse 121 is obtained by forming a logical product of the inverted pulse of a signal 120 obtained by delaying the pulse 117 by means of another delay line 217 and the original pulse 117. The two data pulses 119 and 121 are pulses corresponding to the leading-edge and the tailing-edge, respectively. After the data has been synthesized by the reproduced data synthesizing circuit 222, reproduced data 130 and a clock synchronized therewith, are obtained as outputs. Thereafter, the data is demodulated.

Figure 3:
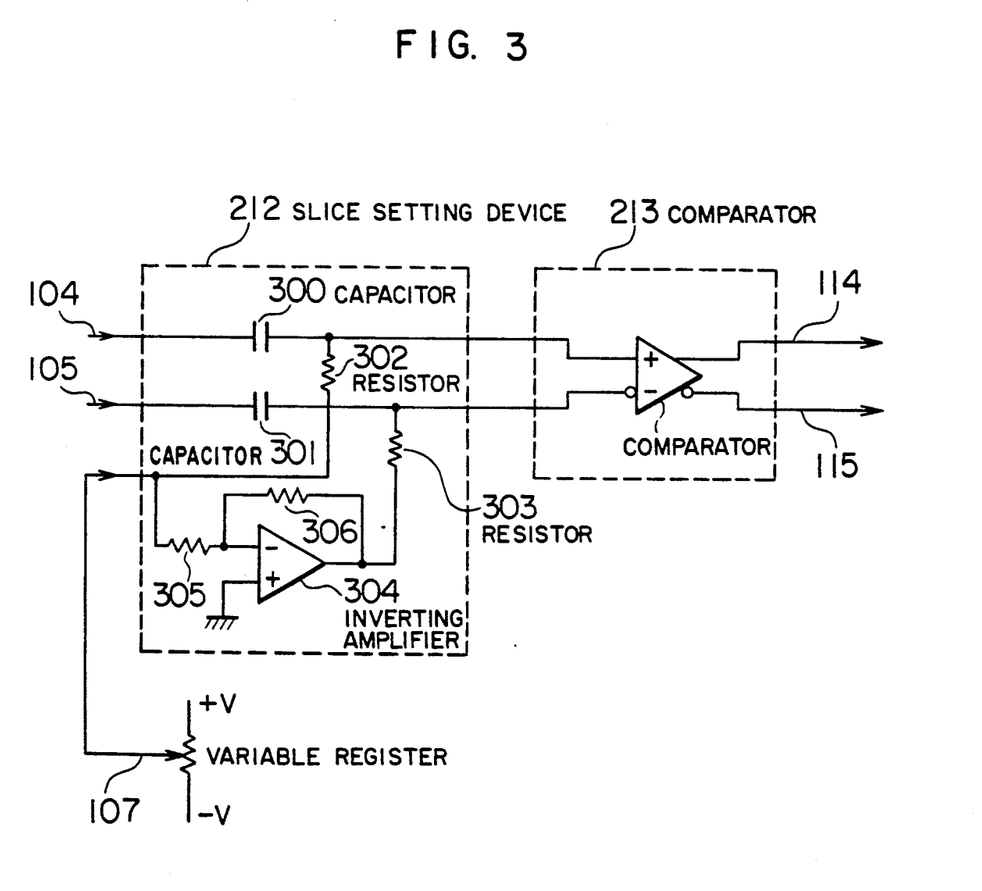
FIG. 3 shows an example of the construction of a slice setting circuit 212.

FIG. 3 shows an example of the construction of the slice setting device 212 and the comparator 213. The slide level 107 is supplied through a resistor 302, after having cut away the DC component by means of a capacitor 300, as a bias voltage for the differential signal 104. On the other hand, it is applied also through a resistor 303, after having cut away the DC component by means of a capacitor 301, as a bias voltage for the differential signal 105. The inverting amplifier 304 is used to invert the polarity of the slice level 107. In the case of the type of circuit indicated in the figure, an input resistor 305 and a feedback resistor 306 have the same resistance. In general, the threshold value for the differential signals 104 and 105 is originally the average level of the signals. However, for the purpose of removing noise included in the signals and noise due to minor defects, etc., a preferable result can be obtained by giving them some bias voltage. The comparator 213 is of differential input-output type and a device, which is used generally as a line-receiver, may be used therefor.

The feature of the present embodiment consists in the structure of the reproduced data synthesizing circuit 222, for which the reproduced pulse 119 from the leading-edge and the reproduced pulse 121 from the tailing-edge detected from the reproduced waveform are inputted separately in different reproduced clock generating circuits. A pattern detecting circuit is disposed after the reproduced clock generating circuits and the previously known part of the pattern included in the recorded data is detected as reference pattern for the correction. Further, for example, an FIFO (first-in-first-out) memory, etc. is disposed as a memory and data series of the leading-edge and the tailing-edge are successively stored respectively by the corresponding reproduced clocks, while controlling the storing of addresses of the memory so that the time interval between the leading-edge and the tailing-edge of the reproduced pulse corresponding to the known part of the pattern (part used as the reference pattern) has a predetermined value. When the data is read out from the memory, such read-out may be effected by using either one of the reproduced clocks or a different reference clock.

That is, according to the present invention, for the reproduced pulse obtained by making the reproduced binary signal, using the standard threshold level (e.g. the average level of the differential waveform of the reproduced signal, in the case of the recording method, by which the positions of the edges are made correspond to coded word bits}, the reproduced clocks are generated from the leading-edge and the tailing-edge of the reproduced pulse independently from each other so that a different series of reproduced pulses and reproduced clocks are obtained from the leading-edge and the tailing-edge. Then, they are stored successively in the memory so that the interval between the leading-edge and the tailing-edge of the reproduced pulse corresponding to the data has a predetermined value, on the basis of the reproduced pattern corresponding to the domain, whose pattern is previously known (reproduced pulse corresponding to the reference pattern) and the reproduced data, for which the edge shifts produced at recording data are corrected, are obtained by reading out the data from the memory.

In the reproduced clock generating circuit, the reproduced pulse obtained from the leading-edge of the recorded portion (pit or domain) and that obtained from the tailing-edge thereof are inputted separately in different VFO (variable frequency oscillator) circuits and the reproduced clocks synchronized with the respective reproduced pulses are generated. The reproduced data and the reproduced clocks obtained by the different VFO circuits are supplied to different pattern detecting circuits for the leading-edge and the tailing-edge and known particular pattern portions used as the reference pattern for correcting the time interval are detected, respectively. As these particular patterns, e.g. a part of a VFO pulling-in pattern disposed at the head of user data or a resynchronizing pattern (RSYNC pattern) disposed in the user data, is used. The data series corresponding to the reproduced pulses are successively stored in the memory, while controlling the addressing of the memory so that the detected pulses are in a predetermined relationship, after having obtained detected pulses indicating a correspondence between the patterns by means of the pattern detecting circuit. The reading-out of the stored data is effected by using either one of the reproduced clocks or a different reference clock. The reference clock and the data read-out by using it are supplied to a demodulating circuit. By the method described above, it is possible to realize a stable demodulation, even if the edge-shifts produced at the time of recording take place, for which variations in the pit length at the recording exceed the detection-window width. Further, since the reproduced clock synchronizing pattern (VFO SYNC) domain as the particular domain, whose pattern is known, can be used in common as the domain for the generation and the synchronization of the reproduced clock, which is the original object, as well as the reference pattern domain for the correction of the edge-shifts, which is the object of the present invention, and also since the resynchronizing pattern (RESYNC) inserted for every particular data length in the data domain can be used as the reference pattern, it is possible to reconstruct the data series during reproduction without increasing any overhead, and without the prior art data format, and to demodulate data without any problem, even if there are edge-shifts at the recording.

Figure 4:
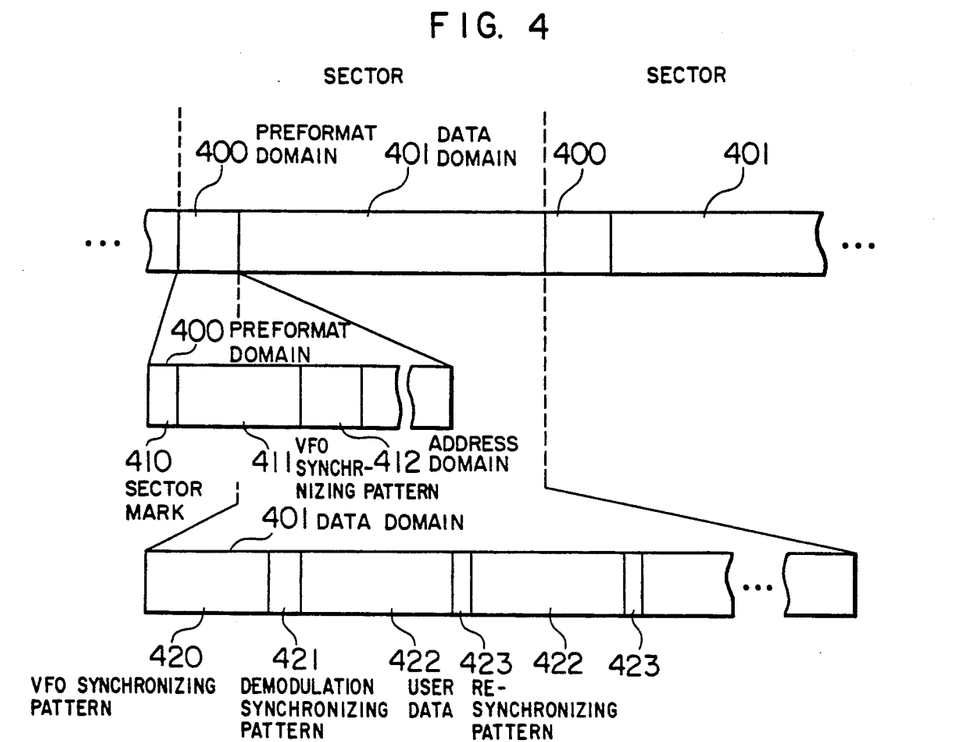
FIG. 4 shows an example of the construction of the sector format used for realizing the present invention.

At first a sector format for synthesizing the reproduced data will be explained. FIG. 4 shows an example of the structure of the sector format on a disc. On an optical disc, in general, a track is divided into a plurality of sectors and each sector is divided into a preformat domain 400, previously formed at the time of formatting of the disc, and a data domain 401 separate therefrom. The preformat domain 400 is divided further into a sector mark 410 indicating the head of the relevant sector, a VFO synchronizing pattern 411 for the reproduced clock generation, and an address domain, 412, where track addresses and sector addresses is recorded, etc. User data are recorded in the data domain 401, and in the format structure of this data domain 401 there are a VFO synchronizing pattern 420, a user data demodulation starting pattern 421, user data 422, and a resynchronizing pattern 423 for executing resynchronization of the reproducing clock within the user data.

Figure 5:
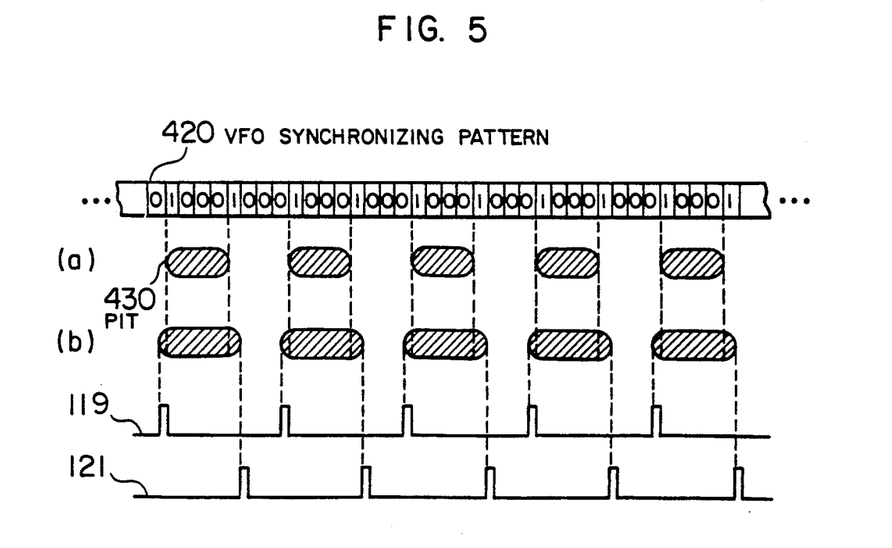
FIG. 5 shows the relationship between pits of the reference pattern portion and edge detection pulses.

Next, some explanation of the VFO synchronizing pattern 420 used as an example of the particular reference pattern for executing the reproduced data synthesis will be made. For the VFO synchronizing pattern, a repetitive pattern having a predetermined duty ratio is used. For example, in the case of 2-7 modulation, supposing that the data bit length is represented by T, a repetitive pattern of 1.5 T, which is the most dense pit pattern, is often used. This is for the purpose of improving the synchronizing characteristics of a PLL (phase locked loop), and since this is the most adjacent pit interval pattern, it is not always an optimum pattern as a recording condition. If there are no problems concerning the PLL characteristics, it can be thought that, for the purpose of the recording, a repetitive pattern of 2.0 T or a repetitive pattern having a longer pattern length is preferably used, rather than the 1.5 T pattern, which is the most dense pattern having a great thermal inference effect. Further, also for the purpose of the reproduction, a remarkable effect of suppressing the decrease in the amplitude of the reproduced signal due to interference between different waveforms can be obtained. As the reference pattern for the reproduced data synthesis, it is useful for not increasing the overhead to use the second half of this VFO synchronizing pattern 420. FIG. 5 shows the relation between a coded word pattern of the VFO synchronizing pattern 420 and the pits 430 corresponding thereto. Ideally, as indicated in line (a), the "1"s of the coded word should be recorded, corresponding exactly to leading-edges and tailing-edges of the pits 430. However, in practice, as indicated in line (b), the position of the leading-edges and tailing-edges of the pits 430 is not completely in accordance with the position of the "1"s in the coded word because of variations in the characteristics of the recording medium, the recording conditions, etc. At this time, reproduced pulses 119 and 121 are outputted, corresponding to the leading-edges and the tailing-edges of the pits 430, respectively. Since the pattern series of the VFO synchronizing pattern 420 used as the reference pattern is already known, regardless of the user data, if the reproduced pulses 119 and 121 can be corrected into a normal positional relation, it is possible to obtain the demodulation-synchronizing pattern 420 also in the state indicated in line (b) and the normal data pulse series also for the user data 422. Apart from the VFO synchronizing pattern 420, e.g. the resynchronizing pattern 423 is also a known particular pattern, regardless of the user data, and it can be used as the reference pattern for correcting the positional relation. According to the present invention, the reproduced pulses 119 and 120 are applied to different VFO circuits to generate the reproduced clocks. Further, a domain of the second half of the VFO synchronizing pattern 420 is stabilized sufficiently and is used as the known reference pattern for the reproduced data synthesis, and two series of the reproduced data are stored in a memory so as to obtain the normal bit series. In this way, even in the state as indicated in line (b) of FIG. 5, e.g. in the case where the edge positions of the pits exceed the data detecting-window width, it is possible to effect stable demodulation of the data. Further, even in the case where defects or deviations in the synchronization of the PLL take place on the disc, it is possible to suppress influences thereof to the smallest by using the resynchronizing pattern as the reference pattern for correcting the time interval.

Next, an example of the construction of the reproduced data synthesizing circuit 222 and the operation thereof will be explained, referring to FIGS. 6 and 7. The synchronizing circuit 222 consists of two circuits 600, 601; pattern detecting circuits 602, 603; writing address control circuits 604, 605 for a register A and a resister B; the register A 606, the register B 607; an output control circuit 608 and a data generation control circuit 609 for the registers A and B.

Figure 6:
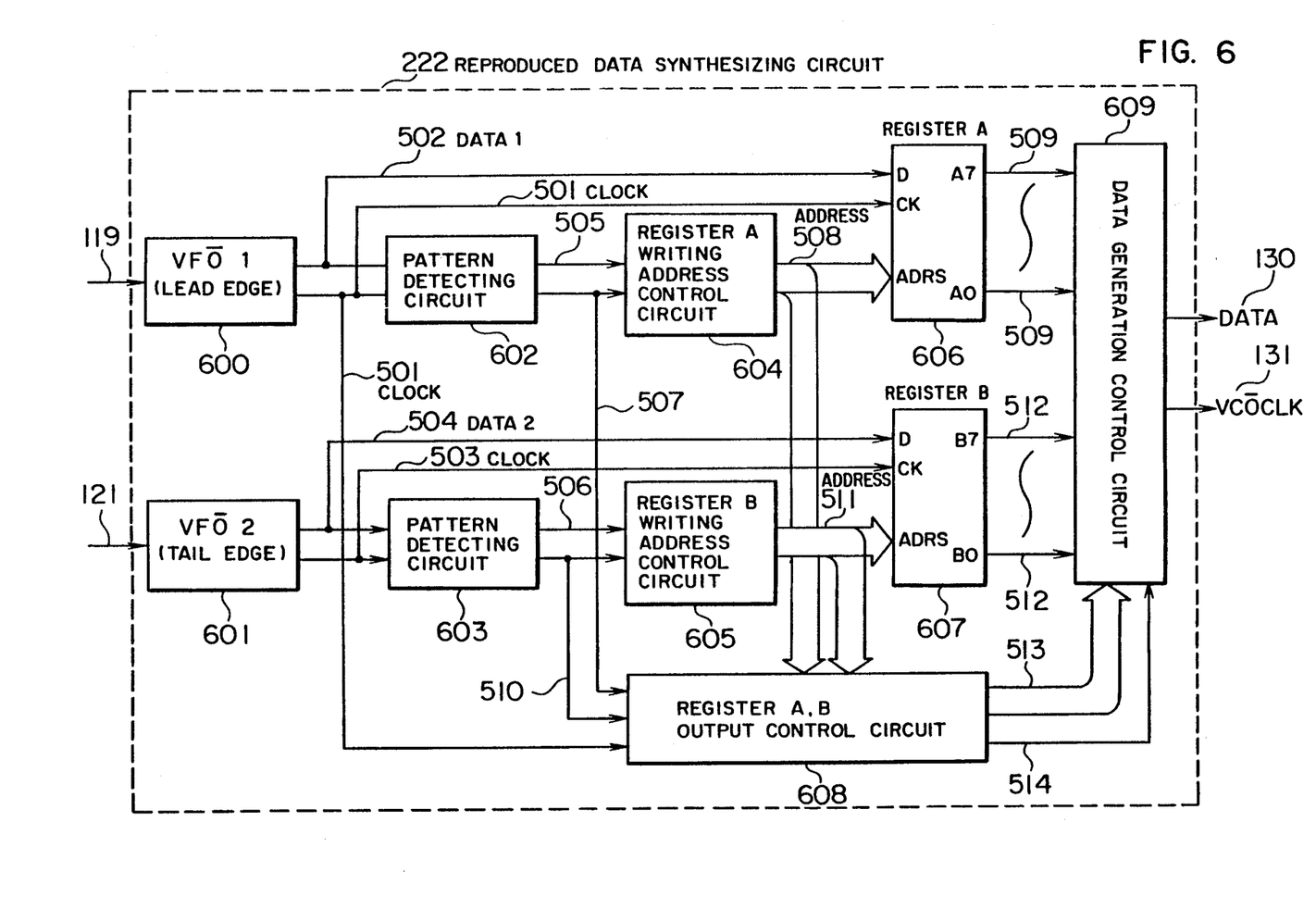
FIG. 6 shows an example of the construction of the reproduced data synthesizing circuit 222.
Figure 7:
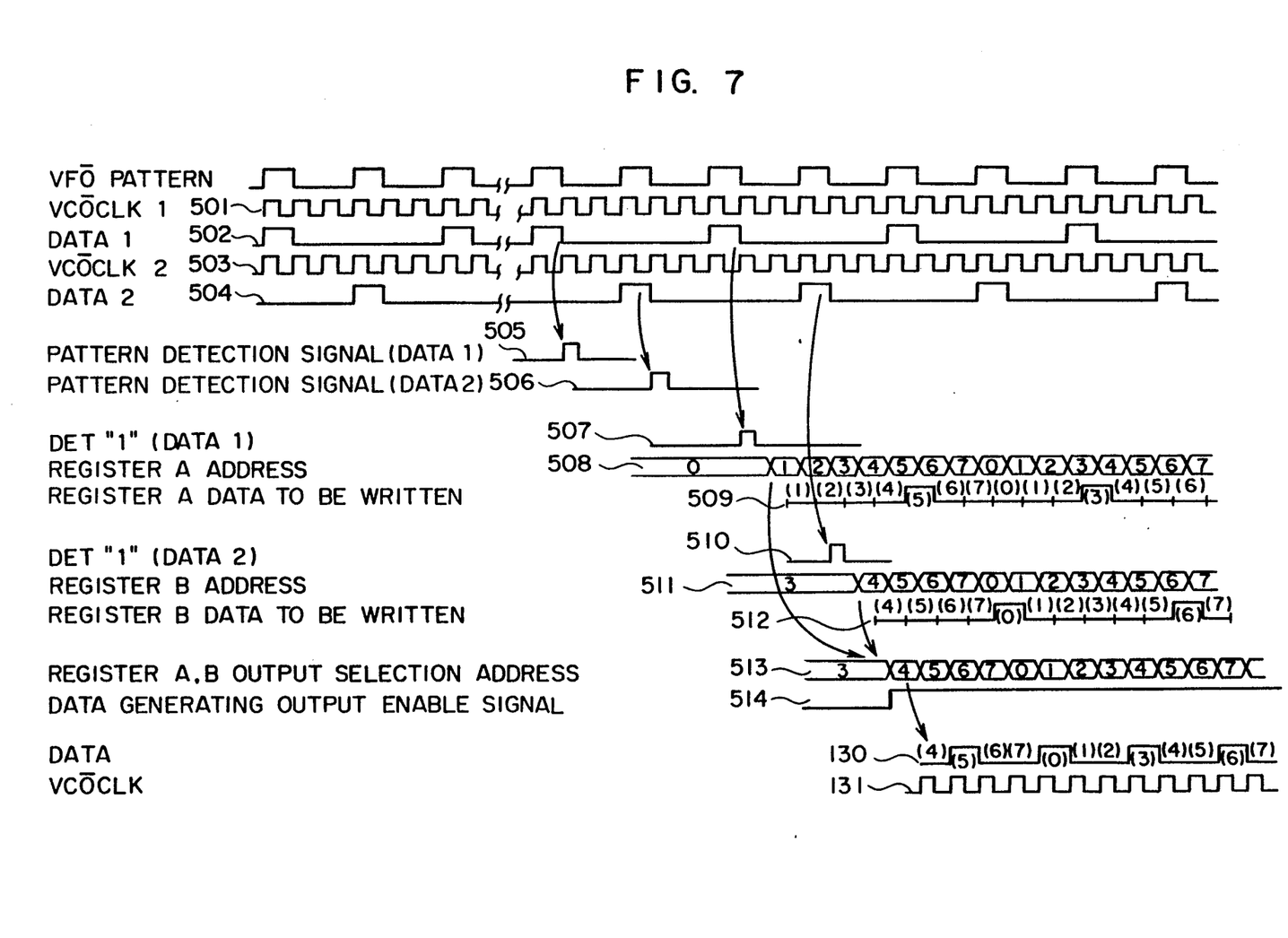
FIG. 7 is a time chart showing the operation of the circuit indicated in FIG. 6.

FIG. 7 is a time chart indicating the operation of the device indicated in FIG. 6. The following explanation will be made, referring to both the figures. The leading-edge data pulse 119 is applied to a VFO 1 circuit 600 to obtain a VCO clock (VCOCLK 1) 501 and data (DATA 1) 502 synchronized with the clock stated above. The construction of this VFO 1 circuit may be that used heretofore. In the same way, a VCO clock (VCOCLK 2) 503 and data (DATA 2) 504 are obtained by a VFO 2 circuit 601 from the tailing-edge data pulse 121. In FIG. 7, it is shown that the data is useful at the falling edge of the corresponding pulse. The data the clock are supplied to the pattern detecting circuits 602 and 603 and pattern detection signals 505 and 506 are outputted, corresponding to the leading-edge and the tailing-edge. Each of the pattern detecting circuits 602 and 603 can consist of a shift register and a gate circuit for judging the correspondence the pattern. The construction itself may be identical to the type used for the detection in U.S. Pat. No. 4,835,759 and U.S. Pat. No. 4,866,692 stated previously. The pattern detecting circuits 602 and 603 output data "1" just after the output of the pattern detection signals 505 and 506 as detection pulses 507 and 510, respectively. As a circuit for this purpose, e.g. a D flipflop is used. A desired result will be obtained, if the flipflop is st by the detection signal 505 and when the data 502 coming just after the Q output of the flipflop has turned to "H", it is outputted. This is true also concerning the generation of the detecting pulse 510. The address 508 of a register A 606 starts the count-up from the point of time where the detection pulse 507 is inputted. Similarly, the address 511 of a register B 607 starts the count-up, just after the detection pulse 510 has bene inputted. The register A 606 and the register B 607 are memory devices providing serial input and parallel output. The data 502 is written in the register A 606 by the clock 501, corresponding to the writing address 508 of the register A 606. In the same way, the data 504 is written in the register B 607 by the clock 503, corresponding to the writing address 511 of the register B. Here, the writing address 511 of the register B starts from "3". This is because, as the VFO pattern 420 used in common as the reference pattern for correcting the edge shifts, a repetitive pattern of 1.5 T, i.e. speaking of the number of clocks, a pattern, in which one element of data "1" exists for 3 clocks, is used. That is, this is the reason why, in the case where a "122" of the leading-edge data is written in an address "0", the normal position, where "1" of the tailing-edge data should be written-in, is an address "3". Since the operation time chart indicated in FIG. 7 represents a case where a repetitive pattern of 1.5 T is used as the reference pattern for the reproduced data synthesis, the address 508 of the register A starts from "0" and the address 511 of the register B from "3". For example, if a repetitive pattern of 2.0 T is used as the reference pattern, the address 511 of the register B may be started from "4". In this way, when the data written in the registers A and B are read out by using a common address, this means that the synthesis of the reproduced data has been performed exactly and the edge-shifts have been corrected. A data generation permitting signal 514 is generated at a point of time, where the address 511 of the register B started by the detection pulse 510 from the output control circuit 608 has been counted up to "4", to indicate that the succeeding data series shows the reproduction synthesis termination. Thus, it is possible to obtain exactly reproduced DATA 130, for which the edge shifts have been corrected, by reading out successively the outputs 509 and 512 of the registers A and B by using a common address 513. The clock 501 may be used as the clock 131. The clock 503 or the recording clock used at the pit recording may be used also as the clock 131, provided that the frequency thereof is identical. In this case, this can be realized easily, if the registers A and B are FIFO (first-in-first-out) memories and the input and the output side thereof can be controlled by clocks independently from each other.

Although, in the example of the circuit construction indicated in FIG. 6, memories of 8-bit length are used for the registers A and B, there are no particular restrictions on the bit length, but e.g. using memories of data bit length corresponding to one sector, after having stored data of one whole sector, reading-out from the memories may be executed. However, in the case where successive sector reading is executed, since a decrease in the throughput is conceivable, it is desirable to select a suitable bit length from the point of view of the increase in the throughput.

In the reproduced data synthesizing circuit 222, since the time interval between the leading-edge data pulse 119 and the tailing-edge data pulse 121 can be known, depending on how far the interval between the two data pulses is deviated from the normal interval in the reference repetitive pattern part, it is possible also to perform feedback to the recording state, e.g. by decreasing the recording power, in the case where the pit length is too great, and on the contrary by increasing the recording power, in the case where the pit length is too small.

Further, when deviations from the normal interval exceed a certain reference value, presuming that the recording state is imperfect, the data may be rewritten in another new sector. That is, this fact can be used for a RAW (read-after-write) check.

Figure 8:
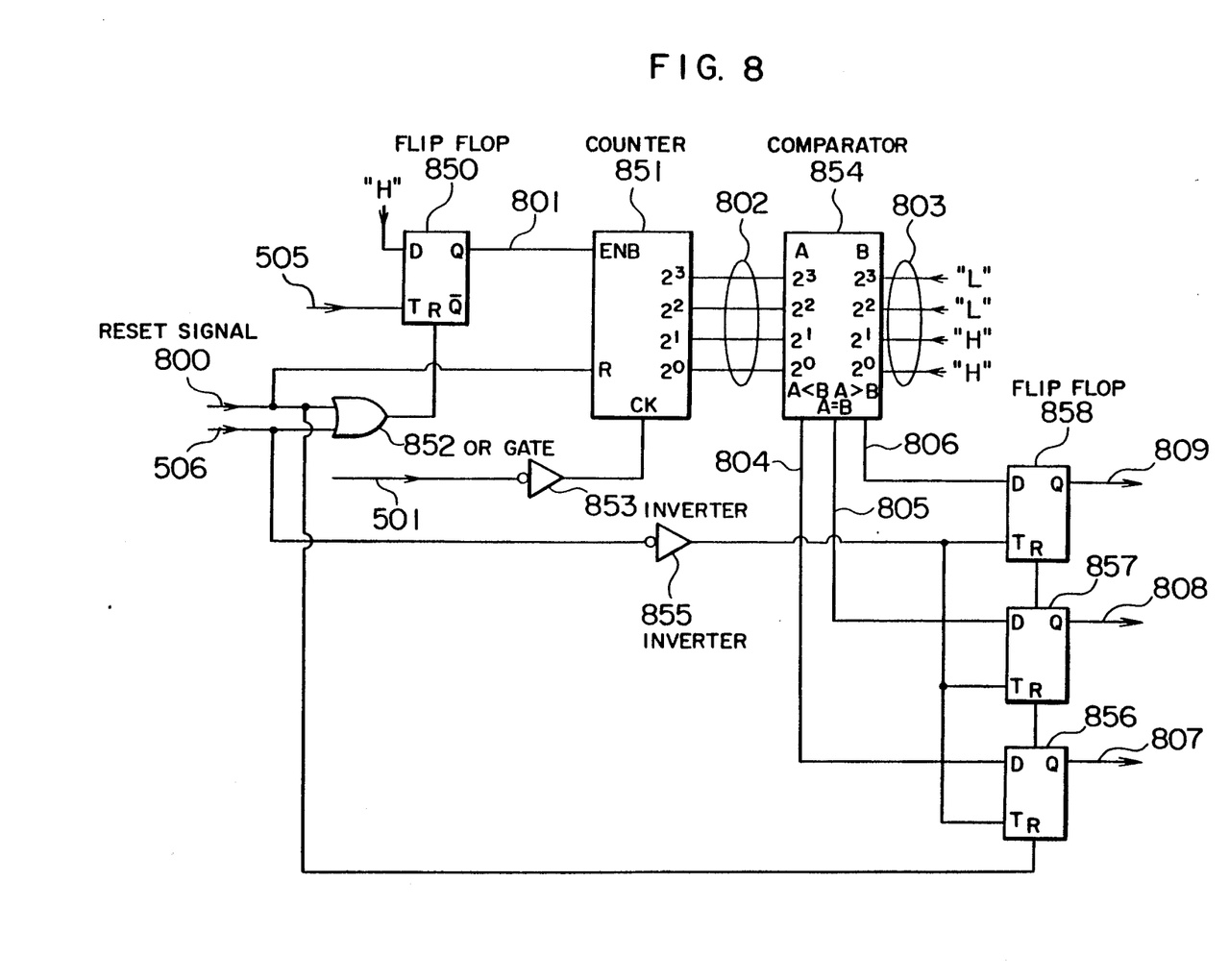
FIG. 8 shows an example of the construction of a circuit for judging the length of a recorded portion.
Figure 9:
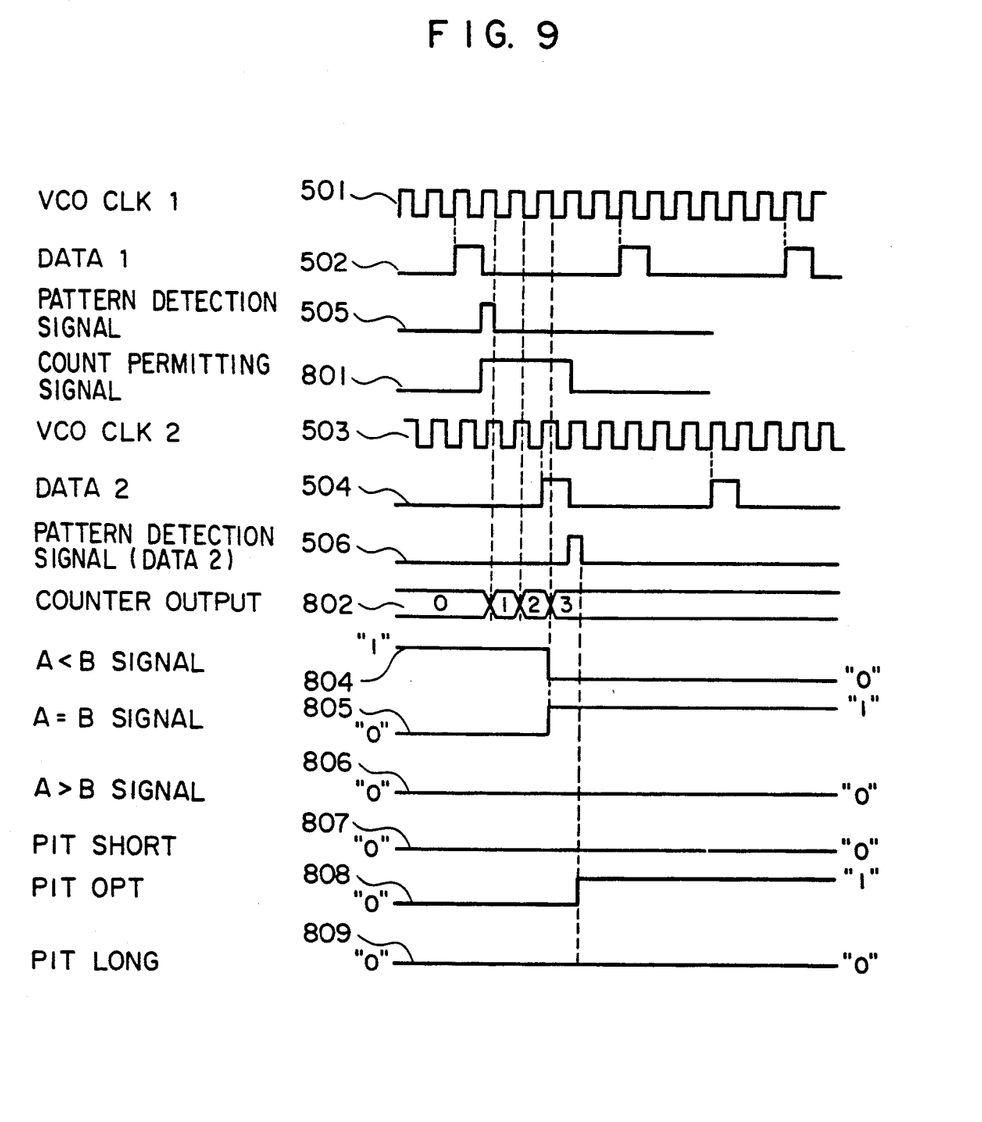
FIG. 9 is a time chart for explaining the operation of the circuit indicated in FIG. 8.

FIG. 8 shows an example of the construction of the recorded portion length (pit length or domain length) judging circuit used for the RAW check, and FIG. 9 is a time chart for explaining the operation of the circuit indicated in FIG. 8. The operation of the judging circuit will be explained below, referring to both the figures. The pattern detection signal 505 is a signal outputted when it is detected that the pattern series from the pit leading-edge is the VFO synchronizing pattern 420 serving as the reference pattern determined previously. The Q output 801 of a flipflop 850 is set by the rising edge of this detection signal 505 to be at the "H" level. This count enabling signal 801 is connected with an enable input (ENB) of the counter 851 and the counter 851 begins to count in response to the rising edge of the signal obtained by inverting VCOCLK 1 501 by means of an inverter 853, i.e. by the fall of the relevant clock. The output 802 of the counter 851 is connected with the A input side of a comparator 854 and compared with a value 803, which is set previously on the B input side of the comparator 854. In the example indicated in the figure, for the case where repetition of "100" is presumed for the VFO synchronizing pattern 420 serving as the reference pattern, "3", i.e. only the $2^0$ and $2^1$ positions are at the "H" level. As the output of the comparator 854, there is a signal indicating the relation of the magnitude between the A input and the B input. When A<B, only a signal 804 is at the "H" level. In the same way, when A=B, only a signal 805 is at the "H" level, and when A>B, only a signal 806 is at the "H" level. These magnitude judging signals 804 to 806 are connected with the D inputs of flipflops 856 to 858, respectively. Consequently, the logic level given to one of the D inputs is latched at the point of time where the rise of the clock is inputted in the T input of the relevant one of the flipflops 856 to 858. The falling edge of the pattern detection signal 506 is used as the clock. The example of the time chart indicated in FIG. 9 shows the case where the pit length is nearly appropriate and in this case only a pit OPT signal 808 is at the "H" level. If the pit length is smaller than the normal length, since the fall of the pattern detection signal 506 is inputted in the flipflop 856 in the state, where a A<B signal 804 is at the "H" level, only a pit SHORT signal is at the "H" level. In the same way, in the case where the pit length is greater than the normal length, only a LONG signal is at the "H" level. Consequently, if these pit length judging signals 807 to 809 are read-out by a control device of higher rank, it is possible to detect whether the pit length recorded in a relevant sector or the recording power is greater or smaller than the normal power.

If the B input signal 803 set at the comparator is varied appropriately, the procedure described above can be applied to any other pattern.

Furthermore, the application of the present invention is not restricted to the ablative optical disc, but it can be applied also to other optical discs, e.g. those of magneto-optical type, phase-change type, etc., in particular, if they are of pit length recording type.

Although FIG. 1 indicates a case where a second order differential circuit is used for detecting the edges, another reproduced data synthesizing processing can be applied as well, even if it is effected by a method by which the reproduced signal 100 is directly sliced, or by a method by which it is sliced by using the average value of the envelope of the reproduced signal 100.

According to the present invention, even if there are fluctuations in the length of the recorded pits or the recorded domains due to variations in the recording conditions and fluctuations in the recording characteristics of the recording medium, it is possible to realize a stable data demodulation by inputting data pulses detected from each of the leading-edges and the tailing-edges of the pits at the time of reproduction in separate reproduced clock generating circuits and by synthesizing a reproduced data pulse series thus obtained on the basis of reproduced data from the reference pattern portion. Further, feedback to the recording conditions can be performed by monitoring the time interval between the leading-edge data and the tailing-edge data detected by the reproduced data synthesizing circuit in the reference pattern portion, and in addition an effect can be obtained that it is possible to realize optimum recording conditions.

What is claimed is:

1. A method recording/reproducing information comprising:
   a step of recording a reference pattern in a certain predetermined domain so that the leading-edge and the tailing-edge of a certain recording portion are positioned in a predetermined relationship, such that coded bits of data are recorded on a recording medium by forming recorded portions physically different from not recorded portions, while making the data bits correspond to leading-edges and tailing-edges of the recorded portions;
   detecting a first and a second reproduced signal, indicating the leading-edge and the tailing-edge of the recorded portion, respectively, independently from each other, from a reproduced waveform corresponding to the recorded portion, which has been thus recorded; and
   reconstructing the first and the second reproduced signal, while correcting edge shifts produced at recording data by storing the first and the second reproduced signal in a memory, so that said first and said second reproduced signal indicate the leading-edge and the tailing-edge of said recorded portion corresponding to said reference pattern, respectively, in said predetermined relationship;
   wherein a first and a second clock are generated independently in synchronism with said first and said second reproduced signal, respectively; said first and said second reproduced signal are recorded in said memory in synchronism with said clocks, respectively, while controlling an address in said memory so that they are in said predetermined relationship; and data are reconstructed in synchronism with a third clock by combining the outputs of said memory.

2. A method of recording/reproducing information according to claim 1, wherein a synchronizing pattern recorded together with said data is used as said reference pattern.

3. A method of recording/reproducing information according to claim 2, wherein said synchronizing pattern includes a variable frequency oscillator synchronizing pattern disposed at the head of said data and a resynchronizing pattern inserted for every predetermined length in said data.

4. A method of recording/reproducing information according to claim 1, wherein a repetitive pattern having a predetermined pattern length is used as said reference pattern and recorded together with said data.

5. A method of recording/reproducing information according to claim 4, wherein the data bit length being represented by T, said predetermined pattern length is 1.5 T or 2.0 T.

6. A method of recording/reproducing information according to claim 1, wherein the length of the recorded portion corresponding to said reference pattern is detected on the basis of said first and said second detected signal.

7. A method of recording/reproducing information according to claim 7, wherein recording power for forming the recording portion corresponding to said data is controlled, depending on the length of said recorded portion thus detected.

8. A method recording/reproducing information according to claim 1, wherein one of said first clock, said second clock, and the recording clock at the time of recording said data is used as said third clock.

9. An apparatus for recording/reproducing information comprising:
  recording/reproducing means, which records a reference pattern in a certain predetermined domain so that the leading-edge and the tailing-edge of a certain recorded portion are positioned in a predetermined relationship, such that coded bits of data are recorded on a recording medium by forming recorded portions physically different from not recorded portions, while making the data bits correspond to leading-edges and tailing-edges of the recorded portions and obtains a reproduced waveform corresponding to the recorded portion, which has been thus recorded;
  edge detecting means, which detects a first and a second reproduced signal indicating the leading-edge and the tailing-edge of said recorded portion, respectively, independently from each other from said reproduced waveform; and
  reproduced data synthesizing means, which reconstructs the first and the second reproduced signal while correcting edge shifts produced at recording data by storing the first and the second signal thus detected independently in a memory means, so that a first and a second signal thus detected indicate the leading-edge and the ailing-edge of said recorded portion corresponding to said reference pattern recorded in the predetermined domain, respectively, in said predetermined relationship;
  wherein said reproduced data synthesizing means comprises:
  first pattern detecting means, which detects that the first reproduced signal is in accordance with the pattern of the leading-edge of the recorded portion corresponding to said reference pattern, and outputs the first detected signal;
  second pattern detecting means, which detects that the second reproduced signal is in accordance with the pattern of the tailing-edge of the recorded portion corresponding to said reference pattern, and outputs the second detected signal;
  first writing address control means, which, started by the first detected signal, starts a count from the first address;
  second writing address control means, which, started by the second detected signal, starts a count from the second address, which is in a predetermined relationship to the first address;
  first register means, which writes data corresponding to said first reproduced signal in the address assigned by the output of the first writing address control means in synchronism with a first clock synchronized with said first reproduced signal;
  second register means, which writes data corresponding to said second reproduced signal in the address assigned by the output of the second writing address control means in synchronism with a second clock synchronized with said second reproduced signal; and
  means for obtaining data synchronized with a third clock by synthesizing the outputs of the first and the second register means.

10. An apparatus for recording/reproducing information according to claim 9, wherein said reproduced data synthesizing means comprises:
  (a) first variable frequency oscillator means receiving said first reproduced signal and outputting said first clock and data corresponding to said first reproduced signal; and
  (b) second variable frequency oscillator means receiving said second reproduced signal and outputting said second clock and data corresponding to said second reproduced signal.

11. An apparatus for recording/reproducing information according to claim 9, wherein a recording medium, in which a preformat region previously formed and a data region are arranged alternately along a track, is used as said recording medium and a resynchronizing pattern recorded together with said data in said data region is used as said reference pattern.

12. An apparatus for recording/reproducing information according to claim 11, wherein said synchronizing pattern includes a variable frequency oscillator synchronizing pattern disposed at the head of said data and resynchronizing patterns inserted for every predetermined length in said data.

13. An apparatus for recording/reproducing information according to claim 9, wherein either one of said first clock, said second clock, and a recording clock used at recording said data is used as said third clock.

14. An apparatus for recording/reproducing information comprising:
  recording/reproducing means, which records a reference pattern in a certain predetermined domain so that the leading-edge and the tailing-edge of a certain recorded portion are positioned in a predetermined relationship, such that coded bits of data are recorded on a recording medium by forming recorded portions physically different form not recorded portions, while making the data bits correspond to leading-edges and tailing-edges of the recorded portions and obtains a reproduced waveform corresponding to the recorded portion, which has been thus recorded;

edge detecting means, which detects a first and a second reproduced signal indicating the leading-edge and the tailing-edge of said recorded portion, respectively, independently from each other from said reproduced waveform; and reproduced data synthesizing means, which reconstructs the first and the second reproduced signal while correcting edge shifts produced at recording data by storing the first and the second signal thus detected independently in a memory means, so that a first and a second signal thus detected indicate the leading-edge and the tailing-edge of said recorded portion corresponding to said reference pattern recorded in the predetermined domain, respectively, in said predetermined relationship;

wherein said edge detecting means comprises:

(a) means for obtaining a first order differential signal and a second order differential signal from said reproduced waveform;

(b) means for obtaining a pulse indicating zero cross points of said second order differential signal from said reproduced waveform;

(b) means for obtaining a pulse indicating zero cross points of said second order differential signal by using pulses obtained from said first order differential signal as a gate; and (c) first and second edge pulse detecting means for detecting a first and a second reproduced signal from said pulses indicating the zero cross points independently from each other.

15. An apparatus for recording/reproducing information according to claim 14, further comprising means for detecting the length of the recording portion corresponding to said reference pattern on the basis of said first and said second detection signal.

16. An apparatus for recording/reproducing information comprising:

recording/reproducing means, which records a reference pattern in a certain predetermined domain so that the leading-edge and the tailing-edge of a certain recorded portion are positioned in a predetermined relationship, such that coded bits of data are recorded on a rotating recording medium by forming recorded portions physically different from not recorded portions by irradiating the medium with a light beam, while making the data bits correspond to leading-edges and tailing-edges of the recorded portions and obtains a reproduced waveform corresponding to the recorded portion, which has been thus recorded, from light reflected by said recording medium;

edge detecting means, which detects a first reproduced signal and a second reproduced signal indicating the leading-edge and the tailing-edge of said recorded portion, respectively, independently from each other from said reproduced waveform; and reproduced data synthesizing means, which includes first and second memory means storing said first reproduced signal and said second reproduced signal, respectively; and first and second writing address control means, which are started by a first and a second detected signal indicating the leading-edge and the tailing-edge of said recorded portion corresponding to said reference pattern and controls writing addresses in said first memory means and writing addresses in said second memory means, respectively, so that they are in said predetermined relationship; and synthesizes the outputs of said first and said second memory means to output results thus obtained; wherein said reproduced data synthesizing means comprises:

first clock generating means for generating a first clock synchronized with said first reproduced signal;

second clock generating means for generating a second clock synchronized with said second reproduced signal; and means for obtaining data synchronized with a third clock by synthesizing the outputs of said first and said second memory means, wherein said first memory means writes the data corresponding to said first reproduced signal in synchronism with said first clock and said second memory means writes the data corresponding to said second reproduced signal in synchronism with said second clock.

17. An apparatus for recording/reproducing information according to claim 16, wherein a recording medium, in which a preformat region previously formed and a data region are arranged alternately along a track, is used as said recording medium and a resynchronizing pattern recorded together with said data in said data region is used as said reference pattern.

18. An apparatus for recording/reproducing information according to claim 17, wherein said synchronizing pattern includes a variable frequency oscillator synchronizing pattern disposed at the head of said data and resynchronizing patterns inserted for every predetermined length in said data.

19. An apparatus for recording/reproducing information according to claim 16, wherein either one of said first clock, said second clock, and the recording clock used at recording said data is used as said third clock.

20. An apparatus for recording/reproducing information comprising:

recording/reproducing means, which records a reference pattern in a certain predetermined domain so that the leading-edge and the tailing-edge of a certain recorded portion are positioned in a predetermined relationship, such that coded bits of data are recorded on a rotating recording medium by forming recorded portions physically different from not recorded portions by irradiating the medium with a light beam, while making the data bits correspond to leading-edges and tailing-edges of the recorded portions and obtains a reproduced waveform corresponding to he recorded portion, which has been thus recorded, from light reflected by said recording medium;

edge detecting means, which detects a first reproduced signal and a second reproduced signal indicating the leading-edge and the tailing-edge of sad recorded portion, respectively, independently from each other from said reproduced waveform; and reproduced data synthesizing means, which includes first and second memory means sorting said first reproduced signal and said second reproduced signal, respectively; and first and second writing address control means, which are started by a first and a second detected signal indicating the leading-edge and the tailing-edge of said recorded portion corresponding to said reference pattern and controls writing addresses in said first memory means and writing addresses in said second memory means, respectively, so that they are in said predetermined relationship; and synthesizes the outputs of said first and said second memory means to output results thus obtained;

wherein said reproduced data synthesizing means comprises:

first pattern detecting means, which detects that the first reproduced signal is in accordance with the pattern of the leading-edge of the recorded portion corresponding to said reference pattern, and outputs the first detected signal; and second pattern detecting means, which detects that the second reproduced signal is in accordance with the pattern of the tailing-edge of the recorded portion corresponding to said reference pattern, and outputs the second detected signal.

21. A method of recording/reproducing information by means of an apparatus, which records information by forming recorded portions physically different from not recorded portions and reproduces said recorded portions, comprising:

a step of recording information, corresponding to the leading-edge and the tailing-edges of the recorded portions so that said leading-edge portions and said tailing-edge portions are located in a predetermined order relation in a certain specified region;

a step of detecting said leading-edge portions and said tailing-edge portions separately by sensing a different polarity between first-order differential signals corresponding to leading-edge portions and tailing-edge portions during reproduction of recorded information;

a step of storing information thus detected in memory means; and a step of reconstructing information stored in said memory on the basis of said predetermined order relation in said certain specified region.

22. A method of recording/reproducing information according to claim 21, wherein coded bits are made to correspond to said leading-edge portions and said tailing-edge portions of said recorded portions and by means of two series of reproduced clock generating means, which are synchronized with reproduced pulses corresponding to said leading-edge portions and said tailing-edge portions of said recorded portions, respectively, at the reproduction, independently from each other, when, using two series of reproduced clocks generated by said reproduced clock generating means, said reproduced pulses synchronized with said reproduced clocks, independently from each other, are stored in memory means, said reproduced pulses are stored therein while controlling the address in said memory means so that the relation of the order of said reproduced pulses obtained from the leading-edge portions and the tailing-edge portions of a specified pattern portion recorded previously at recording the information is in a normal order relation, and when reproduced data are read out from said memory means, either one of said reproduced clocks or a different clock is used.

23. A method of recording/reproducing information comprising:

a step of recording a reference pattern in a certain predetermined domain so that the leading-edge and the tailing-edge of a certain recorded portion are positioned in a predetermined relationship, such that coded bits of data are recorded on a recording medium by forming recorded portions physically different form not recorded portions, while making coded bits of data correspond to leading-edges and tailing-edges of the recorded portions;

detecting a first and second reproduced signal, indicating the leading-edge and the tailing-edge of the recorded portion, respectively, independently from each other, from a reproduced waveform corresponding to the recorded portion, which as been thus recorded;

correcting edge shifts of the first and the second reproduced signal indicating the leading-edge and tailing-edge;

storing the first and the second reproduced signals in a memory, while controlling addressing of the memory so that the first and the second reproduced signals are positioned in the memory in a predetermined relationship; and reconstructing a reproduced signal using the first and second reproduced signals.

24. A method of recording/reproducing information according to claim 23, wherein a first and a second clock are generated independently in synchronism with said first and said second reproduced signal, respectively; said first and said second reproduced signal are recorded in said memory in synchronism with said clocks, respectively, while controlling an address in said memory so that they are in said predetermined relationship; and data is reconstructed in synchronism with a third clock by combining the outputs of said memory.

25. A method of recording/reproducing information according to claim 24, wherein said first clock generated from leading-edge pulse, or second clock generated from tailing-edge pulse, or a clock for writing data is used as said third clock.

26. A method of recording/reproducing information according to claim 23, wherein a synchronizing pattern recorded together with said data is used as said reference pattern.

27. A method of recording/reproducing information according to claim 26, wherein said synchronizing pattern includes a variable frequency oscillator synchronizing pattern disposed at the head of said data and a resynchronizing pattern inserted for every predetermined length in said data.

28. A method of recording/reproducing information according to claim 23, wherein a repetitive pattern having a predetermined pattern length is used as said reference pattern and recorded together with said data.

29. A method of recording/reproducing information according to claim 28, wherein the data bit length being represented by T, said predetermined pattern length is 1.5 T or 2.0 T.

30. A method of recording/reproducing information according to claim 23, wherein the length of the recorded portion corresponding to said reference pattern is detected on the basis of said first and said second detected signal.

31. A method for recording/reproducing information according to claim 30, wherein recording power for forming the recording portion corresponding to said data is controlled, depending on the length of said recorded portion thus detected.

32. An apparatus for recording/reproducing information comprising:

recording/reproducing means, which records a reference pattern in a certain predetermined domain so that the leading-edge and the tailing-edge of a certain recorded portion are positioned in a predetermined relationship, such that coded bits of data are recorded on a recording medium by forming recorded portions physically different form not recorded portions, while making the data bits correspond to leading-edges and tailing-edges of the recorded portions and obtains a reproduced waveform corresponding to the recorded portion, which ha been thus recorded;

edge detecting means, which detects a first and a second reproduced signal indicating the leading-edge and the tailing-edge of said recorded portion, respectively, independently from each other from said reproduced waveform; and reproduced data synthesizing means, which reconstructs the first and the second reproduced signal with a certain timing while correcting edge shifts produced at the time of recording data by storing the first and the second signals with respective timings independently of each other in a memory as a first and a second signal indicating he leading-edge and the tailing-edge of said recorded portion corresponding to said reference pattern recorded in the predetermined domain, respectively, in said predetermined relationship.

33. An apparatus for recording/reproducing information, comprising:

recording/reproducing means, which records a reference pattern in a certain predetermined domain so that the leading-edge and the tailing-edge of a certain recorded portion are positioned in a predetermined relationship, such that coded bits of data are recorded on a rotating recording medium by forming recorded portions physically different from not recorded portions by irradiating the medium with a light beam, while making the data bits correspond to leading-edges and tailing-edges of the recorded portions, to obtain a reproduced waveform corresponding to the recorded portions, which has been thus recorded, from light reflected by said recording medium;

edge detecting means, which detects a first reproduced signal and a second reproduced signal indicating the leading-edge and the tailing-edge of said recorded portion, respectively, independently from each other, from said reproduced waveform; and reproduced data synthesizing means, which includes first and second memory means for storing said first reproduced signal and said second reproduced signal, respectively, and first and second writing address control means, which are started by a first and a second detected signal indicating the leading-edge and the tailing-edge of said recorded portion corresponding to said reference pattern, for controlling writing addresses in said first memory means and writing addresses in said second memory means with a certain clock synchronized with the first and second reproduced signals, respectively, so that said signals are stored in said predetermined relationship, and for synthesizing the outputs of said first and said second memory means to output synthesized data.

* * * * *